(12) United States Patent
Weber

(10) Patent No.: US 9,685,274 B2
(45) Date of Patent: Jun. 20, 2017

(54) ELECTRIC CAPACITOR FOR A COOLANT COMPRESSOR

(71) Applicant: SECOP Austria GmbH, Fuerstenfeld (AT)

(72) Inventor: Bernard Weber, Burgauberg (AT)

(73) Assignee: Secop Austria GmbH, Fuerstenfeld (AT)

( * ) Notice: Subject to any disclaimer, the term of this patent is extended or adjusted under 35 U.S.C. 154(b) by 0 days.

(21) Appl. No.: 14/392,218

(22) PCT Filed: Jun. 27, 2014

(86) PCT No.: PCT/AT2014/050147
§ 371 (c)(1),
(2) Date: Dec. 24, 2015

(87) PCT Pub. No.: WO2014/205474
PCT Pub. Date: Dec. 31, 2014

(65) Prior Publication Data
US 2016/0189870 A1    Jun. 30, 2016

(30) Foreign Application Priority Data
Jun. 27, 2013    (AT) ................. GM214/2013

(51) Int. Cl.
*H01G 9/08*    (2006.01)
*H01G 4/32*    (2006.01)
(Continued)

(52) U.S. Cl.
CPC ................. *H01G 4/32* (2013.01); *H01G 2/10* (2013.01); *H01G 4/224* (2013.01); *H01G 9/08* (2013.01);
(Continued)

(58) Field of Classification Search
None
See application file for complete search history.

(56) References Cited

U.S. PATENT DOCUMENTS 6,366,446 B1    4/2002    Schweikert et al.
6,819,545 B1 *  11/2004   Lobo ................ H01G 9/12
                                                              361/15
(Continued)

FOREIGN PATENT DOCUMENTS

DE    24 30 437 A1    1/1976
DE    83 24 681 U1    2/1985
(Continued)

OTHER PUBLICATIONS

International Search Report of PCT/AT2014/050147, mailed Sep. 24, 2014.
(Continued)

*Primary Examiner* — Dion R Ferguson
(74) *Attorney, Agent, or Firm* — Collard & Roe, P.C.

(57) ABSTRACT

The invention relates to an electric capacitor having at least one capacitor coil, a cylindrical housing that surrounds the capacitor coil, composed of metal, electric connectors, and connection lines that run in the housing interior and electrically connect the capacitor coil with the connectors, wherein at least one connection line has a planned breaking point, and wherein at least one circumferential depression is formed in the mantle of the housing, which depression divides the housing into a first segment and a second segment and can be unfolded by means of excess pressure in the housing interior, wherein the first segment surrounds the capacitor coil and the second segment carries the connectors.

14 Claims, 1 Drawing Sheet

Figures 1, 2:
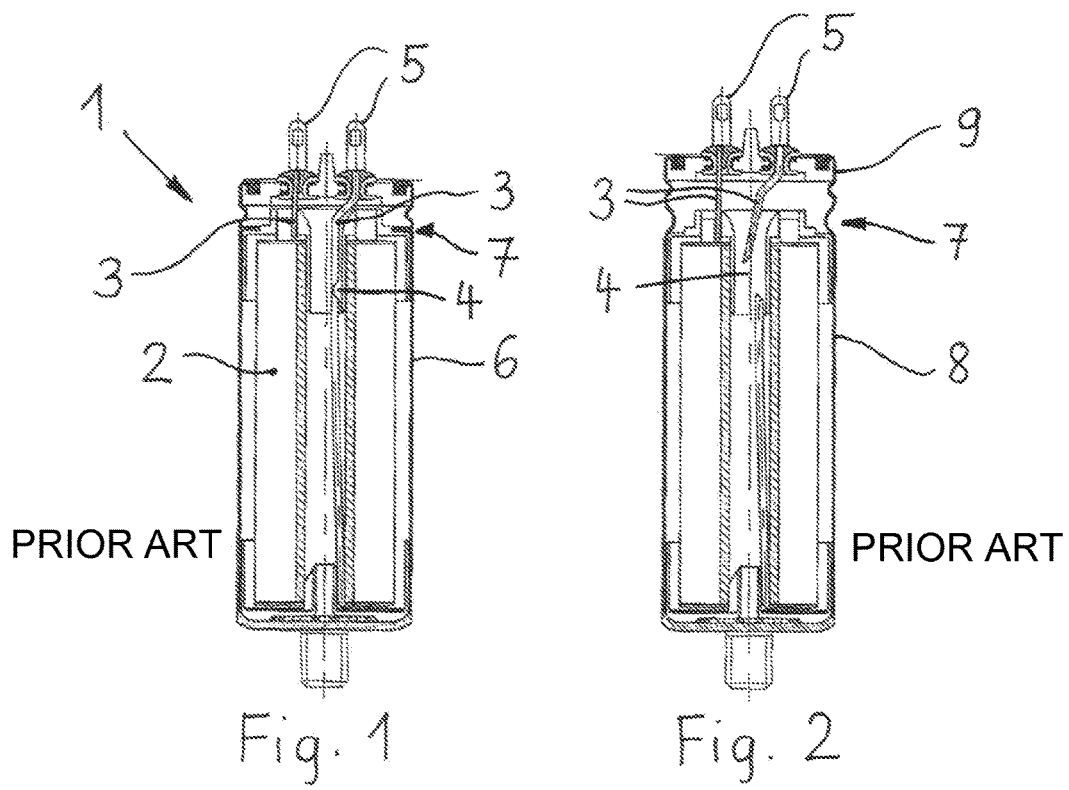

(51) Int. Cl.
*H01G 9/12* (2006.01)
*H01G 2/10* (2006.01)
*H01G 4/224* (2006.01)
*H01G 9/15* (2006.01)
*H01G 11/18* (2013.01)

(52) U.S. Cl.
CPC ............... *H01G 9/12* (2013.01); *H01G 9/151* (2013.01); *H01G 11/18* (2013.01)

(56) References Cited

U.S. PATENT DOCUMENTS

2010/0195271 A1* 8/2010 Abe ................. H01G 9/12 361/519
2014/0368972 A1* 12/2014 Azais ............... H01G 9/12 361/502
2015/0044525 A1* 2/2015 Jourdren ........... H01G 9/08 429/55

FOREIGN PATENT DOCUMENTS

DE 198 11 862 C1 6/1999
JP 2001-167987 A 6/2001
JP 2012-064842 A 3/2012

OTHER PUBLICATIONS

Austrian Search Report in GM 214/2013, dated Feb. 20, 2014.
Response to the European Patent Office by European Patent Attorney in PCT/AT2014/050147, dated Apr. 8, 2015, with English translation of relevant parts.
Response to the European Patent Office by European Patent Attorney in PCT/AT2014/050147, dated Jul. 28, 2015, with English translation of relevant parts.

* cited by examiner

PRIOR ART    PRIOR ART

US 9,685,274 B2
1

ELECTRIC CAPACITOR FOR A COOLANT COMPRESSOR

CROSS REFERENCE TO RELATED APPLICATIONS

This application is the National Stage of PCT/AT2014/050147 filed on Jun. 27, 2014, which claims priority under 35 U.S.C. §119 of Austrian Application No. GM 214/2013 filed on Jun. 27, 2013, the disclosure of which is incorporated by reference. The international application under PCT article 21(2) was not published in English.

The invention relates to an electric capacitor having at least one capacitor coil, a cylindrical housing that surrounds the capacitor coil, composed of metal, electric connectors, and connection lines that run in the housing interior and electrically connect the capacitor coil with the connectors, wherein at least one connection line has a planned breaking point, and wherein at least one circumferential depression is formed in the mantle of the housing, which depression divides the housing into a first segment and a second segment and can be unfolded by means of excess pressure in the housing interior, wherein the first segment surrounds the capacitor coil and the second segment carries the connectors.

In the state of the art, self-healing capacitors are known, which are provided with excess pressure protection. In the event of a short circuit or voltage penetration through the dielectric, the metal layer around the penetration point evaporates due to the high temperature of the arc that forms between the electrodes. The metal vapor is pressed away from the center of the penetration point within microseconds, due to the pressure that occurs during penetration, so that an electrically non-conductive zone forms in the region of the penetration point, and thereby the functions of the capacitor are maintained. Because of the regeneration capacity, self-healing capacitors therefore do not need to be specially secured against short-circuits.

However, the self-healing capacity of the dielectric decreases with increasing age and under constant overload, and thereby the risk of a non-healing short-circuit increases greatly.

For this reason, such capacitors possess what is called an excess-pressure shut-off mechanism or a break-away device, thereby preventing bursting of the hermetically sealed metallic housing, on the one hand, and bringing about contact interruption, on the other hand. An excess pressure in the capacitor brings about lengthening of the cylindrical housing by means of unfolding of a circumferential depression in the housing mantle, wherein the upper segment of the housing, which carries the connectors, is pressed upward. At least one of the connection lines that run within the capacitor is stretched by lengthening of the housing, and tears at a planned breaking point, thereby irreversibly interrupting the feed of current to the capacitor coils. In this connection, the term "self-healing" should not be equated with "fail-safe."

Capacitors equipped with such excess pressure protection are also called Type B/Class P2 capacitors, because they meet the safety requirements of certain standards.

However, electrolyte capacitors have another failure mechanism, as a rule: An excess pressure in the electrolyte capacitor brings about that planned breaking points in the housing open up and function as a valve, so that electrolyte can exit from the capacitor and the electrolyte capacitor dries out. Such electrolyte capacitors are known, for example, from JP 2012-064842 A, JP 2001-167987 A, and DE 19811862 C1.

Another type of capacitors, namely P0 capacitors, will be described briefly below. A P0 capacitor, in contrast to P2 capacitors, does not possess any specific devices that make failure of such a capacitor safe. In the event of a failure or an overload, the capacitor coil can overheat and melt, start to smoke, and even catch fire. Melted material can splash into the surroundings.

It is therefore necessary to take specific measures when using such capacitors, in order to guarantee the safety of persons and objects. The recommendations for such capacitors comprise, among other things: P0 capacitors are only allowed to be used in lighting fixtures if the capacitor is disposed in non-critical surroundings (non-flammable materials). Capacitors not having an excess-pressure shut-off mechanism or break-away device must be encapsulated within an additional metal housing that prevents flammable materials from catching fire.

Only capacitors having an excess-pressure shut-off mechanism or break-away device are suitable for use in sensitive environments. In case of doubt, safe capacitors must be used.

Up to the present, there have been two possibilities that are compatible with safety regulations: The use of P2 capacitors with grounding or the use of P0 capacitors with an additional protective housing.

When using P2 capacitors, attention must be paid to ensuring that either the metal housing, which is accessible from the outside, is grounded, i.e. a grounding line must be provided, or installation of the capacitor within a device must take place in such a manner that touching the capacitor housing is not possible, for example in an inaccessible niche or recess of the device. However, providing a grounding line is disadvantageous, because this makes installation and wiring more complicated and more expensive.

Another possibility consists in using P0 capacitors having an additional protective housing or a plastic housing, in general.

For use in compressors, particularly coolant compressors, special safety requirements exist, because here, the capacitor is usually disposed at the periphery of the compressor and therefore carries the risk, at an exposed location, of putting people and objects in jeopardy. Furthermore, the available space is slight, so that providing a grounding line is disadvantageous in this regard.

The goal of the present invention consists in making available a capacitor having an excess-pressure shut-off device, which capacitor does not have the disadvantages known from the state of the art, and meets the safety standards even if no grounding of the metallic housing is present. Such a capacitor should be simple and cost-advantageous to produce. Retrofitting of existing capacitors with regard to these requirements should be possible.

This goal is achieved, with a capacitor mentioned initially, in that the first segment of the housing carries an electric insulation, particularly composed of plastic, and is surrounded by this insulation, wherein the electric insulation extends at most all the way to the depression.

Because of the electric insulation, grounding of the metallic housing is no longer necessary. The grounding connectors and lines are eliminated, thereby making it possible for production and installation to take place in simpler and more cost-advantageous manner. Depending on the application case, the first segment can be partially or completely surrounded by the insulation, but in any case, the region of the first segment that is accessible in the installed state of the capacitor is surrounded. The insulation is carried by the first segment, i.e. it is attached to the first segment. Even during extension or stretching of the metallic housing in the event of excess pressure in the housing interior, the insulation remains on the first segment. Extension of the metallic housing or unfolding of the depression is not impaired by the insulation on the first segment of the housing, because the insulation reaches at most all the way to the depression. The insulation according to the invention is therefore only connected with the first segment, but not with the second segment.

The depression or fold possesses a U-shaped cross-section in the folded state, in other words when the capacitor is functional. The walls of the depression, which lie opposite one another, can lie tightly against one another or actually touch one another. The depression runs in a plane transverse to the longitudinal axis of the metallic housing. During stretching of the housing (in the case of excess pressure), the depression can be completely or partially unfolded. When the housing is stretched, the first segment and the second segment move away from one another in the axial direction. Usually, the folded depression extends into the housing interior.

By means of the invention, it is therefore also possible to use capacitors from the safety class P2, without grounding the metallic housing.

In an embodiment of the invention, the capacitor is therefore free of grounding connectors.

Preferably, the electric insulation insulates at least the face side of the first segment and a mantle segment that borders on the face side, the length of which segment (in the axial direction) amounts to at least 70%, preferably at least 90% of the length of the first segment (in the axial direction), completely toward the outside. In this way, full-area insulation of the metallic housing relative to a large area is achieved, wherein the remaining part, if any, can be covered by a covering on the second segment, or is not accessible in the installed state, in any case.

Preferably, the electric insulation ends in the region of the depression. As a result, (almost) complete insulation of the second segment toward the outside is achieved, thereby increasing safety.

Preferably, the electric insulation lies against the metallic housing with shape fit, at least in a mantle region. This configuration allows space-saving design, on the one hand, and simple attachment (gluing or press fit) to the first segment of the metallic housing, on the other hand.

Preferably, the electric insulation is formed by a pot-shaped component, particularly by an injection-molded part or a deep-drawn part, which is pushed over the first segment, wherein preferably, the pot-shaped component is attached to the metallic housing by means of press fit. This represents a particularly cost-advantageous solution that is easy to produce, with which even existing capacitors can be retrofitted.

Preferably, the electric insulation is a coating of the metallic housing. As a result, a reliable as well as compact and space-saving design is also obtained.

Preferably, the electric insulation is glued to the metallic housing. As a result, it can be guaranteed that even in the event of sudden stretching of the metallic housing, the insulation reliably adheres to the first segment.

Preferably, the electric insulation has a thickness of at least 1 mm, wherein preferably, the electric insulation has a thickness of at most 4 mm. In this way, the safety requirement can be met without problems.

Preferably, a covering is set onto the second segment of the housing, wherein the edge region of the covering overlaps, at least in part, with the electric insulation carried by the first segment. The covering preferably consists of an electrically insulating material, particularly plastic. This measure increases/these measures increase safety, because reliable insulation is present also in the transition region, and thereby the best possible protection is guaranteed.

Preferably, the electric insulation is disposed in the overlap region between the edge region of the covering and the metallic housing: In this way, the covering can be set on in simple manner, without damaging or displacing the insulation. Furthermore, the insulation can lie closely against the mantle of the first segment.

Preferably, an air gap is provided between the insulation and the second segment of the metallic housing, at least in certain segments. This air gap is preferably situated at least in the mantle region. Safety can be further increased by means of the air gap.

The goal of the invention is also achieved with a compressor, particularly a coolant compressor, which contains a capacitor according to one of the embodiments described above. Specifically in the case of compressors, the capacitors are disposed to be externally accessible, and therefore are the object of special safety precautions.

Figure 3:
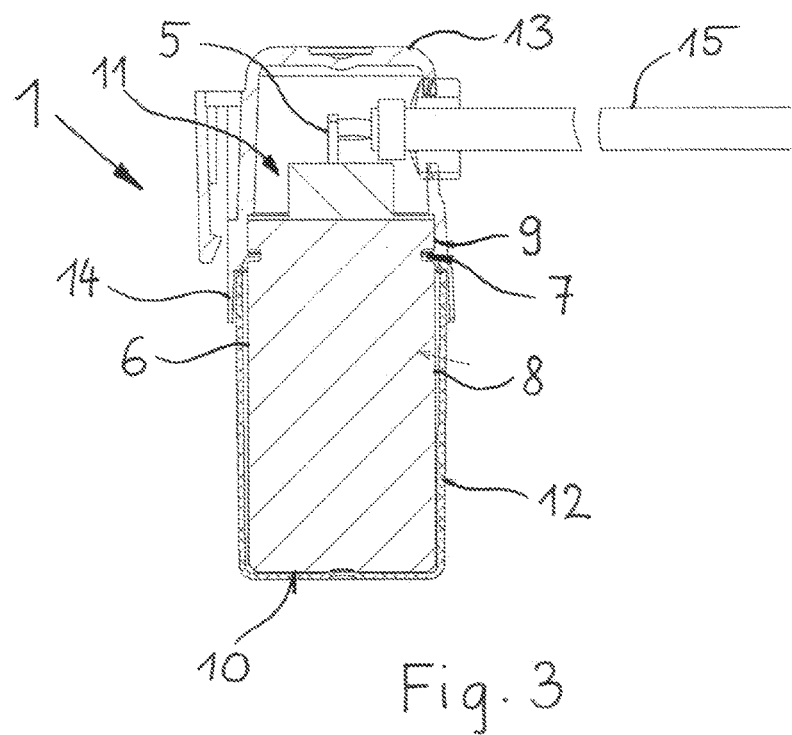

In the following, preferred embodiments of the invention will be described in greater detail using the drawing. In this connection, FIG. 1 shows a capacitor according to the state of the art, in a state capable of functioning, FIG. 2 shows the capacitor from FIG. 1 with the housing stretched, in an irreversibly damaged state, FIG. 3 shows a capacitor according to the invention.

FIG. 1 shows an electric capacitor 1 having a capacitor coil 2 and a cylindrical housing 6 that surrounds the capacitor coil 2, composed of metal. Electric connectors 5 are provided on a face side of the housing 6. Connection lines 3, which electrically connect the capacitor coil 2 with the connectors 5, run in the housing interior. One of the connection lines 3 possesses a planned breaking point 4, for example as weakening of the cross-section. The connection line tears at this planned breaking point when the housing 6 expands (FIG. 2).

A circumferential depression 7 is formed in the mantle of the housing 6, which depression divides the housing 6 into a first segment 8 and a second segment 9 and can be unfolded by means of excess pressure in the housing interior. In this regard, the housing 6 extends along its longitudinal axis. In this regard, FIG. 1 shows the non-stretched normal state, and FIG. 2 shows the stretched state, in which the function of the capacitor has been irreversibly impaired.

The first segment 8 surrounds the capacitor coil 2, and the second segment 9 carries the connectors 5.

FIG. 3 now shows a capacitor 1 according to the invention, which has the same structure in its interior as the capacitor shown in FIG. 1. To increase clarity, the internal structure of the capacitor 1 was not shown once again in FIG. 3. The first segment 8 of the housing 6 carries an electric insulation 12, particularly composed of plastic, and is surrounded by the insulation 12. The electric insulation 12 extends, according to the invention, at most all the way up to the depression 7. In the exemplary embodiment shown, the electric insulation 12 ends in the region of the depression 7. The second segment 8 carries the connectors 5 on its face side 11; here, these are already connected with a feed line 15.

In the preferred embodiment, the electric insulation 12 insulates at least the face side 10 of the first segment 8 and a mantle segment that borders on the face side 10, the length of which segment amounts to at least 70%, preferably at least 90% of the length of the first segment 8, completely toward the outside.

The electric insulation 12 can lie against the metallic housing 6 with shape fit, at least in a mantle region of the first segment 8. However, in order to increase safety, it is also conceivable to form an air gap between the mantle of the first segment 8 and the insulation 12, at least in certain regions.

In FIG. 3, the electric insulation 12 is formed by a pot-shaped component, particularly an injection-molded part or a deep-drawn part, which is pushed over the first segment 8. The pot-shaped component can be attached to the first segment 8 of the housing 6 by means of press fit, for example. An alternative would be the use of an adhesive.

A further possibility would consist in providing the electric insulation 12 as an insulating coating of the first segment 8.

In order to guarantee the required safety, the electric insulation 12 has a thickness of at least 1 mm. Preferably, it is not thicker than 4 mm.

In the embodiment shown in FIG. 3, a covering 13 in the form of a cap is set onto the second segment 9 of the housing 6, wherein the edge region 14 of the covering 13 overlaps, at least in part, with the electric insulation 12 carried by the first segment 8. In this regard, the electric insulation 12 lies in the overlap region between the edge region 14 of the covering 13 and the metallic housing 6.

The covering 13 serves as additional protection and is also produced from electrically insulating material, particularly from plastic or rubber. It comprises a passage opening, through which a feed line 15 electrically connected with the connectors 5 is passed.

The invention is not restricted to the embodiments described and to the aspects emphasized in them. Instead, a great number of modifications is possible within the idea of the invention, which lie within the scope of action by a person skilled in the art. Likewise, it is possible to implement further embodiment variants by combining the stated means and characteristics, without departing from the scope of the invention.

The invention claimed is:

1. Electric capacitor (1) having at least one capacitor coil (2), a cylindrical housing (6) that surrounds the capacitor coil (2), composed of metal, electric connectors (5), and connection lines (3) that run in the housing interior and electrically connect the capacitor coil (2) with the connectors (5), wherein at least one circumferential depression (7) is formed in the mantle of the housing (6), which depression divides the housing (6) into a first segment (8) and a second segment (9) and can be unfolded by means of excess pressure in the housing interior, wherein the first segment (8) surrounds the capacitor coil (2) and the second segment (9) carries the connectors (5), wherein the first segment (8) of the housing (6) carries an electric insulation (12) and is surrounded by this insulation on the outside, wherein the electric insulation (12) extends at most all the way to the depression (7), and wherein a covering (13) composed of an electrically insulating material is set onto the second segment (9) of the housing (6), wherein at least one connection line (3) has a planned breaking point (4), and wherein an edge region (14) of the covering (13) overlaps, at least in part, with the electric insulation (12) carried by the first segment (8), in the direction of the longitudinal axis of the housing (6).

2. Capacitor according to claim 1, wherein the electric insulation (12) and/or the covering (13) is composed of plastic.

3. Capacitor according to claim 1, wherein the electric insulation (12) insulates at least the face side (10) of the first segment (8) and a mantle segment that borders on the face side (10), the length of which segment amounts to at least 70% of the length of the first segment (8), completely toward the outside.

4. Capacitor according to claim 3, wherein the length of the mantle segment amounts to at least 90% of the length of the first segment (8).

5. Capacitor according to claim 1, wherein the electric insulation (12) ends in the region of the depression (7).

6. Capacitor according to claim 1, wherein the electric insulation (12) lies against the metallic housing (6) with shape fit, at least in a mantle region of the first segment (8).

7. Capacitor according to claim 1, wherein the electric insulation (12) is formed by a pot-shaped component, which is pushed over the first segment (8).

8. Capacitor according to claim 7, wherein the electric insulation (12) is formed by an injection-molded part or a deep-drawn part.

9. Capacitor according to claim 7, wherein the pot-shaped component is attached to the first segment (8) of the housing (6) by means of press fit.

10. Capacitor according to claim 1, wherein the electric insulation (12) is a coating of the first segment (8) of the metallic housing (6).

11. Capacitor according to claim 1, wherein the electric insulation (12) is glued to the first segment (8) of the metallic housing (6).

12. Capacitor according to claim 1, wherein the electric insulation (12) has a thickness of at least 1 mm.

13. Capacitor according to claim 12, wherein the electric insulation (12) has a thickness of at most 4 mm.

14. Capacitor according to claim 1, wherein the electric insulation (12) is disposed in the overlap region between the edge region (14) of the covering (13) and the metallic housing (6).

* * * * *